United States Patent [19]

Reed

[11] 4,107,471
[45] Aug. 15, 1978

[54] FREQUENCY DIVISION MULTIPLEX COMMUNICATIONS SYSTEM

[75] Inventor: Joseph Reed, Stamford, Conn.

[73] Assignee: International Telephone & Telegraph Corp., Nutley, N.J.

[21] Appl. No.: 779,970

[22] Filed: Mar. 22, 1977

[51] Int. Cl.² .............................................. H04J 1/06
[52] U.S. Cl. ............................. 179/15 FD; 179/2.5 R
[58] Field of Search ........... 179/15 FD, 15 FS, 2.5 R; 325/184

[56] References Cited

U.S. PATENT DOCUMENTS

| 3,809,815 | 5/1974 | Reed | 179/15 FD |
| 3,809,816 | 5/1974 | Reed | 179/15 FD |
| 3,864,521 | 2/1975 | DeLong | 179/15 FD |

Primary Examiner—Kathleen H. Claffy
Assistant Examiner—Joseph Popek
Attorney, Agent, or Firm—John T. O'Halloran; Jeffrey P. Morris

[57] ABSTRACT

An FDM communication system is disclosed wherein two separate intermediate frequencies are utilized in such manner that the difference between transmitting and receiving frequencies thus generated is the difference between the two separate intermediate frequencies, thereby providing the capability of using independent sideband transmission instead of single sideband transmission, thus providing additional channel capacity. A single synthesizer is utilized and a single bandpass filter selects the appropriate upper or lower sidebands of transmission for full duplex operation. One of the two available sidebands is then used for communication, with the other sideband available for signalling, monitoring, break-in or other telecommunication functions.

18 Claims, 1 Drawing Figure

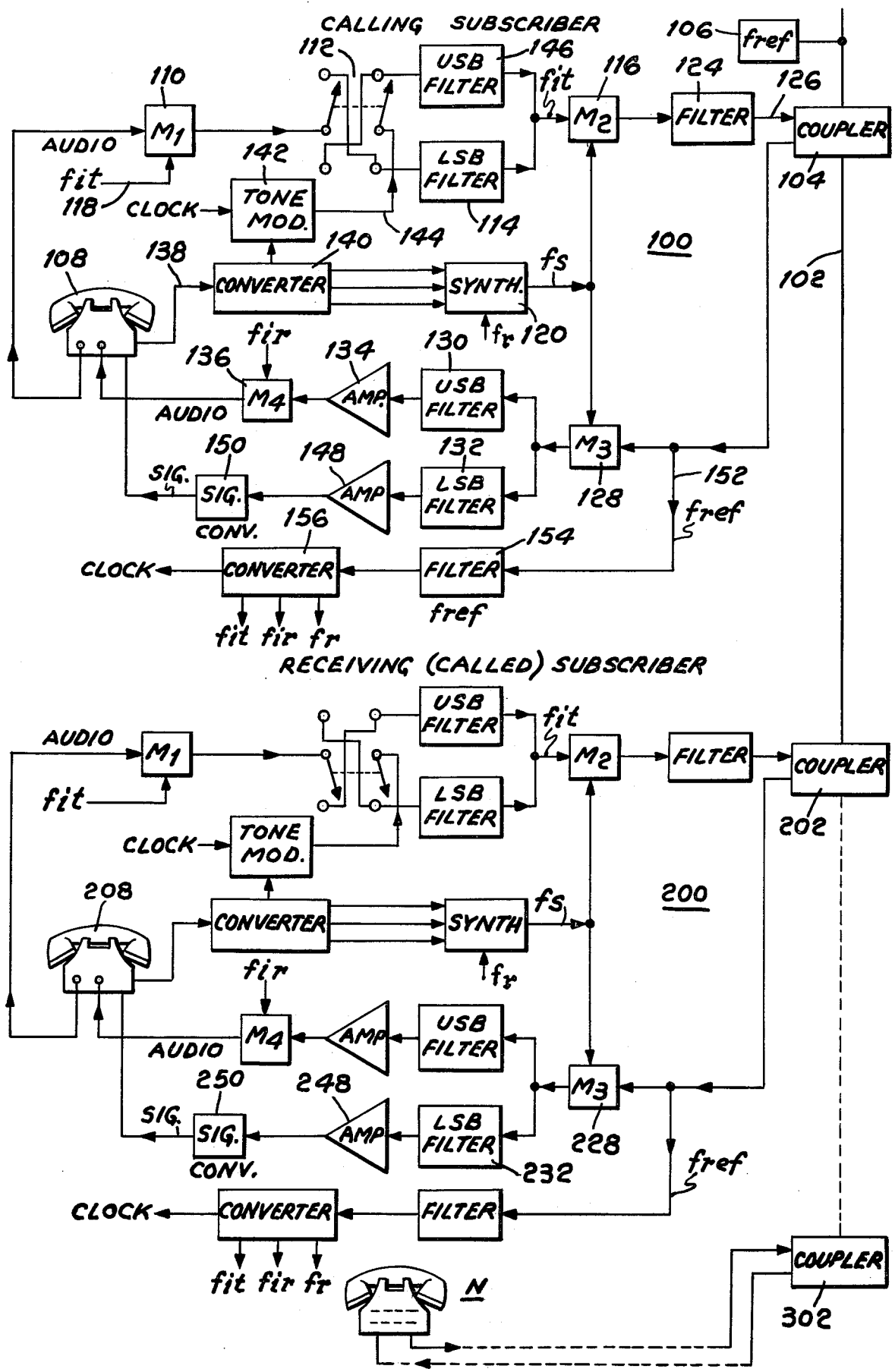

FREQUENCY DIVISION MULTIPLEX COMMUNICATIONS SYSTEM

BACKGROUND OF THE INVENTION

1. Field of the Invention

The present invention relates to frequency division multiplex communications systems in general and to multiple subscriber communications systems in particular, in which simultaneous signalling may be present in the same frequency band as communications without interference therebetween. The present invention also relates to FDM double sideband telecommunications system having improved signalling, addressing and communications supervisory capability and more efficient frequency band utilization and increased receiver sensitivity.

2. Description of the Prior Art

A full duplex communications system of the prior art is described by U.S. Pat. No. 3,809,815 entitled "Communication System Utilizing Frequency Division Multiplexing to Link a Plurality of Stations Each Containing a Switchable Synthesizer", wherein the use of a digital phase lock loop synthesizer is described for generating a series of frequencies which may be utilized in a single sideband communications system, thereby enabling such system to be operable as a switch telephone system. In accordance with the technique described by this patent, single sideband transmission and reception and frequency division multiplexing are used to provide channelization. A bandpass filter in the transmitter provides the necessary inversion of transmitting and receiving frequencies requisite in establishing full duplex communications. Either an upper or lower sideband generated as the output of a balanced modulator is selected automatically.

U.S. Pat. No. 3,809,816 entitled "Communication System Utilizing Frequency Division Multiplexing and a Frequency Plan Therefor" describes the generation of a frequency pattern for providing the requisite transmitting and receiving frequency inversion described with reference to U.S. Pat. No. 3,809,815. U.S. Pat. No. 3,809,816 further describes the relationship between the transmitter intermediate frequency and the frequency transmission band required for system operation.

While neither of the above patents describe apparatus or method for transmission of signalling data required for establishing communications, such signalling data may be transmitted therein either by an in-band signalling system, wherein signalling is performed before and after communications are established, or by an out-of-band system. In such an out-of-band system, a guard band between channels wherein a limited out-of-band signalling filter assembly could be utilized with some limited signalling being achieved. The above-described prior art patents due to their lack of convenient channels for signalling and supervision, do not readily permit system users to perform impromptu conferencing. The described patents use direct synchronous detection for reception which requires that all amplification and filtering occur at the audio or baseband frequencies. It is thus apparent that a folding of frequencies about the zero frequency point occurs requiring that twice the needed channel frequency space be allocated for any communications, since the upper and lower sidebands around the virtual carrier are folded one upon the other. The described prior art patents avoid this by transmitting only a single sideband, either upper or lower, with the opposite sideband not being transmitted. This technique results in a doubling of the noise power and in a reduction of the signal-to-noise ratio of the transmitted signal. In addition, the amplification of the received signal at baseband results in amplifier generated noise. These deficiencies result in a lower limit for the amplitude of the received signal, the sensitivity of the receiver and the maximum amplification available, and also require that filters be designed for operation at audio frequency with the consequences that such filters are substantially larger than similar filters designed for operation at other frequencies.

The present invention and the incorporation thereof in a telecommunications system eliminates the prior art requirements for high gain audio amplification, eliminates the amplifier noise (1/f noise) previously inherent in the prior art baseband frequency amplifiers, eliminates the doubling of noise power due to the frequency folding around the zero frequency and allows the use of smaller and less expensive filters. Thus, both receiver sensitivity and transmitter efficiency are substantially improved with a consequent increase in the signal-to-noise ratio which enables a lengthening of the transmission path over which signals may be transmitted and/or a decrease in the requisite signal power.

A further advantage of the present invention is the elimination of crossover intermodulation products of low order due to the greater flexibility in selection of reference frequencies from the communications band and the consequent elimination of the extremely well-balanced mixers of the prior art. The present invention more effectively utilizes the frequency spectrum of the communications channel than do systems of the prior art in that both upper and lower sidebands of the communications frequency are used simultaneously.

In accordance with a further aspect of the present invention, the generated sidebands are utilized such that communication occurs at one of the two available sidebands, while the other sideband is available for signalling, monitoring, break-in and other functions, such as deriving a busy signal and handshaking in telecommunication systems.

A further advantage of the present communications technique over the prior art is the utilization of one output/input mixer and the duplexing of a single bandpass filter to both reduce the electrical components previously required in each subscriber set as well as the number of taps previously required to be made to gain access to the transmission line in a multiple subscriber telecommunications network which results, due to the difference frequency between transmitter and receiver intermediate frequencies, being substantial, i.e. greater than 50% apart and at radio frequencies as contrasted to the present in systems of the prior art. By the implementation of the present invention and its resultant utilization of less critical balanced modulator and amplifier requirements, greater use of integrated circuit technology may be achieved by integrating substantial system portions in single chip form, thereby further reducing subscriber costs when such systems are produced in large quantity.

SUMMARY OF THE INVENTION

The present invention describes a frequency division multiplex communication system in which the inversion of transmitting and receiving frequencies is achieved by utilization of a bandpass filter having a pass band of twice the frequency difference between the transmitter and receiver intermediate frequency rather than the pass band available with prior art systems of twice the transmitter intermediate frequency. This is accomplished in the present invention by the elimination of the direct synchronization detection circuitry of the prior art and the substitution therefor of a receiver intermediate frequency from which the audio modulation may be derived by filtering of the received signal at a second detector stage. By this technique, the upper and lower sidebands are both available independently with either the upper or lower sideband being assigned for carrying the transmitted signal and the other sideband being utilized for purposes of signalling and/or supervision.

The present invention further describes circuitry and method for utilizing two separate intermediate frequencies related one to the other such that the difference between transmitting and receiving frequencies is the difference between such two separate intermediate frequencies to eliminate the requirement of the prior art that the transmitting and receiving frequencies be separated by a value representative of the transmitting intermediate frequency. The two separate intermediate frequencies are generated by a single frequency synthesizer and the appropriate upper or lower sideband of transmission for full duplex operation is selectable by a single bandpass filter.

It is therefore a primary object of the present invention to provide a new and improved frequency division multiplex telecommunications system and method.

A further object of the present invention is to provide a system and method for the simultaneous transmission of signalling and supervision signals in the same band as communications signals without interference therebetween.

A further object of the present invention is to provide a telecommunications system exhibiting improved signal-to-noise ratios and signal handling capabilities.

Yet another object of the present invention is to provide for switching subscriber sidebands in a multiple subscriber telecommunication system, such that communications occur on one of two transmitted sidebands, while the other transmitted sideband is available for other purposes such as signalling and supervision.

Yet another object of the present invention is to provide a receiver for processing a reference signal without loss with an improved signal-to-noise capability and of simplified design.

Yet another object of the invention is the provision of apparatus providing for improved conferencing capability in a multiple subscriber FDM system.

The foregoing and other features and advantages of the invention will be apparent from the following more detailed description of a preferred embodiment of the invention as illustrated by the accompanying drawings, wherein:

BRIEF DESCRIPTION OF THE DRAWINGS

FIG. 1 is a block diagram of a multiple subscriber FDM system in accordance with the present invention.

DESCRIPTION OF THE PREFERRED EMBODIMENT

Referring now to FIG. 1, a frequency division multiplexed multiple subscriber telecommunications system in accordance with the present invention is illustrated. While a large plurality of subscribers, i.e. thousands of subscribers may effectively utilize the present system, for simplicity of description a typical calling subscriber is illustrated at 100 and a typical receiving subscriber is illustrated at 200, with subscriber N being illustrative of other subscribers sharing the system.

Calling subscriber 100 is connected to the other subscribers via coaxial cable 102 by means of a coupler 104 which may comprise a magnetic coupler. A reference frequency generator 106 may be separately coupled to the coaxial cable 102 and isolated from the transmitting band of each subscriber as illustrated, while being common to all subscribers coupled to cable 102. Audio signals generated at handset 108 are coupled to mixer 110 and via switch 112 to a lower sideband filter 114 having an output which is coupled to mixer 116. The aforedescribed sequence serves to generate a lower sideband adjacent to a virtual carrier centered at frequency $f_{it}$, where $f_{it}$ is the transmitter intermediate frequency coupled to mixer 110 via line 118 which mixer 110 comprises a balanced modulator. A frequency synthesizer 120 generates a synthesizer frequency $f_s$ which is coupled to mixer 116 via line 122. Synthesizer 120 may comprise a voltage tunable oscillator, a reference input, a variable ratio divider and a dial register, all of well known configuration. The resultant output frequencies from mixer 116 which are the sums and differences of $f_s$ and $f_{it}$ are coupled to a filter 124 having a bandwidth characterized in that only $f_s$ minus $f_{it}$ is coupled out on line 126 to coupler 104. An upper sideband signal containing the audio information adjacent to the aforementioned virtual carrier frequency is then coupled to the coaxial cable 102. This is due to the inversion of sidebands which occur when the subtractive terms at the received mixer is the transmitted one and is the reason for the selection of the appropriate sideband filter. The frequency of this upper sideband signal is selected to be equal to the received frequency of the receiving subscriber 200. A received signal equal to the transmitting signal of the receiving subscriber 200 is coupled to mixer 128 which signal is thence coupled to an upper sideband filter 130 and a lower sideband filter 132 on the receiving side of the calling subscriber circuit. The output of mixer 128, the receiver intermediate frequency $f_{ir}$ is selected by upper sideband filter 130, amplified by amplifier 134 and detected by detector 136. Detector 136 is excited by the receiving IF frequency $f_{ir}$.

Simultaneously, a second communication path is established such that signals from subscriber set 108 are coupled via line 138 to a converter 140 which may comprise a well known dial pulse to register converter to set synthesizer 120 to the proper synthesizer frequency $f_s$ and which signals are at the same time modulated by a clock in tone modulator 142. The output of tone modulator 142 is coupled via line 144 through switch 112 to an upper sideband filter 146 the output of which upper sideband filter is then coupled to the coaxial line 102 via modulator 116 and filter 124 and represents a lower sideband adjacent to the virtual carrier. This is due to the inversion of sidebands which occur when the subtractive terms at the received mixer is the transmitted one and is the reason for the selection of the appropriate sideband filter.

On the received side at receiving subscriber 200, any lower sideband signals present are reduced to the receiver intermediate frequency $f_{ir}$ by mixer 228, which is of like configuration as mixer 128, passed through lower sideband filter 232, amplified by amplifier 248, converted to audio frequency by signal converter 250 and utilized to provide ringing, etc. for handset 208. Lower sideband filter 132, amplifier 148, and signal converter 150 on the calling subscriber 100 receiving side perform a like function for handset 108, i.e. ringing, etc.

The reference frequency $f_{ref}$ is coupled to the line 152 from coupler 104 and is filtered by filter 154. The output of filter 154 is coupled to a signal converter 156 wherein amplification and suitable conversion are implemented to provide clock frequencies $f_{it}, f_{ir}$ and $f_r$, which frequencies are the reference frequencies for the calling subscriber station 100. Thus, all subscriber stations derive their respective reference frequencies from the same source. Alternatively, the reference frequency could be picked off after amplification in the channel including filter 232 and amplifier 248.

The subscriber station transmitter need not be energized until communications are desired and the receiver amplifiers for the audio also need not be energized until suitable signals have been received which serves to ensure privacy and prevent inadvertent break-in by another subscriber calling the same station.

The typical receiving (called) subscriber 202 coupled to coaxial line 102 via coupler 202 is of identical configuration as the aforedescribed calling station 100 and transmits and receives in identical manner. Similary, additional subscriber stations shown at N are also of like configuration as subscriber stations 100 and 200 with such additional subscriber stations individually coupled to line 102 via individual couplers such as coupler 302. The present FDM system utilizing independent sideband transmission is readily adaptable to conferencing systems and for call forwarding. For such applications, each subscriber station would include two transmitters and two receivers, of like configuration as aforedescribed.

An illustrative calculation in accordance with the present invention will serve to illustrate a typical subscriber communication frequency plan.

Let
$fa$ = audio bandwidth
$fb$ = bandwidth per channel
$fu$ = upper frequency of communications
$fl$ = lower frequency of communications
$N$ = number of channels (total) = $(fu - fl)/2 fb$
$fu - fl \leq 2 fd$ where $fd$ = difference frequency, and
$fd = fit - fir$ and
$fit$ = transmitter IF
$fir$ = receiver IF. Furthermore, assuming that
(1) $fu/fl \leq 2$ is one constraint, and
(2) $fd \leq 2$ fir is a second constraint, then for the case of
$fb$ = 10 Khz and N = 250,
$fu - fl = 2\ Nfb = 2\ (250 \times 10)$ Khz = 5 Mhz, but
$fd = \frac{1}{2}(fu - fl) = 2.5$ Mhz, and from constraint (2)
$fir \leq 1.25$ Mhz
Setting $fir$ = 1.25 Mhz, then $fd = fit - fir = 2.5$ Mhz and $fit$ = 3.75 Mhz.

When $fu$ and $fl$ are set to provide 5 Mhz space under constraint (1) then $fl$ may be set to = 10 Mhz, $fu$ = 15 Mhz which satisfies constraint (1).

To determine any particular channel $fs$ must be determined, where $fs$ = synthesizer frequency,
$fn$ = channel number, and
$fr$ = receive frequency, then
$fr = fl + nfb$. For channel 1 this is:
10 Mhz + (1)10 Khz = 10.010 Mhz, and
$fs + fir$ = 10.010 Mhz, hence
$fs$ = 10.010 Mhz − 1.25 Mhz = 9.760 Mhz, from which $ft = fs + fit$ = 9.760 Mhz + 3.75 = 12.510, where:
$ft$ = transmit frequency.

Thus $ft - fr$ = 12.510 − 10.010 = 2.50 Mhz = $fd$, as required.

To communicate with this subscriber, it is necessary that the synthesizer is set so that the transmit frequency is equal to receiving subscriber receive frequency. Thus, where primes (1) are used to represent the receiving subscriber;
$f^1t = f^1s - fit = fr$ = 10.010 Mhz. Then:
$f^1s$ = 10.010 + 3.75 = 13.760 Mhz.

The receiver is thus automatically set to the transmit frequency
$f^1r = f^1s - fir$ = 13.760 − 1.25 = 12.510 Mhz.

While the present invention has been described in connection with a preferred embodiment thereof, it is to be understood that additional embodiments, modifications and applications which will become obvious to those skilled in the art are included within the spirit and scope of the invention as set forth by the claims appended hereto.

I claim:
1. A frequency division multiplex communication system, comprising:
a plurality of subscriber stations coupled to a transmission line, each of said stations including at least one transmitter and at least one receiver having respectively an assigned transmitting frequency and an assigned receiving frequency; said assigned frequencies being related by a fixed frequency separation corresponding to the difference in transmitter and receiver intermediate frequencies;
mixer means for mixing a predetermined frequency with said intermediate frequencies to derive an independent sideband signal such that one sideband thereof contains communication information and the other of sideband thereof contains signalling data;
bandpass filter means at said transmitter and said receiver having a passband of approximately twice the difference in frequency between said transmitter intermediate frequency and said receiver intermediate frequency for rejecting undesired mixing products such that the desired sideband signal is selected;
means for coupling said independent sideband signal onto said transmission line; and
means for coupling a common reference frequency onto said transmission line to obtain simultaneous communications and signalling in the same frequency band without interference therebetween.
2. A frequency division multiplex communication system as claimed in claim 1, further including at each of said subscriber stations:
first mixer means for generating a virtual carrier at the transmitter intermediate frequency;
second mixer means for mixing said transmitter intermediate frequency and said predetermined frequency and for generating the sum and difference frequencies thereof; and
filter means for deriving an audio frequency signal from at least one of the outputs of said second mixer means.
3. A frequency division multiplex communication system in accordance with claim 2 further comprising:
synthesizer means for generating said predetermined frequency.

4. A frequency division multiplex communication system in accordance with claim 1 wherein said transmission line comprises a coaxial cable.

5. A frequency division multiplex communication system in accordance with claim 2 wherein the sideband signal containing the information adjacent to said virtual carrier frequency is equal to the receive frequency of the receiving subscriber wherein said transmitting frequency is frequency multiplexed on said transmission line together with the transmitting frequencies of other subscribers.

6. A frequency division multiplex communication system in accordance with claim 2 further comprising at each of said subscriber stations:
    switching means for switching said subscriber sidebands such that communication information is always modulated onto the same sideband.

7. A frequency division multiplex communication system in accordance with claim 1 further comprising:
    isolation means for isolating said reference frequency from the transmission band of each of said subscriber stations.

8. A frequency division multiplex communication system in accordance with claim 1 wherein each of said subscriber stations includes at least two transmitters and two receivers.

9. In a frequency division multiplex communication system, a subscriber station comprising:
    a transmitter and a receiver coupled to a transmission line, said transmitter and receiver having respectively an assigned transmitting frequency and an assigned receiving frequency, said assigned frequencies being related by a fixed frequency separation corresponding to the difference in transmitter and receiver intermediate frequencies;
    mixer means for mixing a predetermined frequency with said intermediate frequencies to derive an independent sideband signal such that one sideband thereof contains communication information and the other sideband contains signalling data;
    bandpass filter means at said transmitter and said receiver having a passband of approximately twice the difference in frequency between said transmitter intermediate frequency and said receiver intermediate frequency, for rejecting undesired mixing products such that the desired sideband signal is selected;
    means for coupling said independent sideband signal onto said transmission line; and
    means for a common reference frequency onto said transmission line to obtain simultaneous communications and signalling in the same frequency band without interference therebetween.

10. In a frequency division multiplex communication system a subscriber station in accordance with claim 9 further comprising:
    first mixer means for generating a virtual carrier at the transmitter intermediate frequency;
    second mixer means for mixing said transmitter intermediate frequency and said predetermined frequency and for generating the sum and difference frequencies thereof; and
    filter means for deriving an audio frequency signal from at least one of the outputs of said second mixer means.

11. In a frequency division multiplex communication system, a subscriber station in accordance with claim 9 further comprising:
    synthesizer means for generating said predetermined frequency.

12. In a frequency division multiplex communication system a subscriber station in accordance with claim 11 wherein said transmission line comprises a coaxial cable.

13. In a frequency division multiplex communication system, a subscriber station in accordance with claim 10 wherein the sideband signal containing the information adjacent to said virtual carrier frequency is equal to the receive frequency of the receiving subscriber wherein said transmitting frequency is frequency multiplexed on said transmission line together with the transmitting frequencies of other subscribers.

14. In a frequency division multiplex communication system, a subscriber station in accordance with claim 10 further comprising:
    switching means for switching said subscriber sidebands such that communication information is always modulated onto the same sideband.

15. In a frequency division multiplex communication system, a subscriber station in accordance with claim 9 further comprising:
    isolation means for isolating said reference frequency from the transmission band of said subscriber station.

16. In a frequency division multiplex communication system, a subscriber station in accordance with claim 9, further comprising:
    second transmitter means;
    second receiver means; and
    means for coupling said second transmitter and second receiver means to said transmission line for conferencing communications.

17. A method for frequency division multiplex communication including the steps of:
    coupling a plurality of subscribers to a transmission line, each of said subscribers having assigned transmitting and receiving frequencies, said frequencies being related by a fixed frequency separation, said separation being the difference in intermediate frequencies used in generating of the transmitting and receiving frequencies;
    mixing a synthesized frequency with said intermediate frequencies to derive an independent sideband signal such that one sideband thereof contains communication information and the other sideband thereof contains signalling data;
    bandpass filtering undesired mixing products to reject and pass undesired and desired upper and lower sideband signals respectively of said mixing products at a passband of approximately twice the difference in frequency between said transmitting and receiving intermediate frequencies; and
    coupling a common reference frequency onto said transmission line together with said independent sideband signal such that simultaneous communications and signalling in the same frequency band without interference therebetween.

18. A method in accordance with claim 17 wherein said mixing step includes generating a virtual carrier at the transmitter intermediate frequency and generating the sum and difference frequencies thereof; and wherein said filtering step includes deriving an audio frequency signal from at least one of said sum or said difference frequencies.

* * * * *